(12) United States Patent
Bunazawa et al.

(10) Patent No.: US 12,326,881 B2
(45) Date of Patent: Jun. 10, 2025

(54) INFORMATION PROCESSING METHOD

(71) Applicant: TOYOTA JIDOSHA KABUSHIKI KAISHA, Toyota (JP)

(72) Inventors: Hideaki Bunazawa, Nagoya (JP); Keisuke Ninomiya, Nisshin (JP); Kunio Suzuki, Tokyo (JP); Yoshitaka Tomiyama, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/815,857

(22) Filed: Aug. 27, 2024

(65) Prior Publication Data

US 2025/0103617 A1 Mar. 27, 2025

(30) Foreign Application Priority Data

Sep. 27, 2023 (JP) ................................. 2023-165679

(51) Int. Cl.
  *G06F 16/28* (2019.01)
  *B60W 40/105* (2012.01)
  *B60W 40/107* (2012.01)

(52) U.S. Cl.
  CPC ......... *G06F 16/285* (2019.01); *B60W 40/105* (2013.01); *B60W 40/107* (2013.01); *B60W 2556/10* (2020.02)

(58) Field of Classification Search
  CPC . G06F 16/285; B60W 40/105; B60W 40/107; B60W 2556/10
  See application file for complete search history.

(56) References Cited

U.S. PATENT DOCUMENTS

2016/0101774 A1* 4/2016 Morisaki ............... B60W 50/14
  701/22
2021/0398442 A1* 12/2021 Nakanishi ............. B60W 30/02

FOREIGN PATENT DOCUMENTS

JP 2008108247 A 5/2008

* cited by examiner

*Primary Examiner* — Apu M Mofiz
*Assistant Examiner* — Oscar Wehovz

(57) ABSTRACT

A first relative frequency distribution in original data is calculated for each of feature amounts. Data segments are cut out from the original data using time windows. A second relative frequency in extracted data is calculated for each of the feature amounts. An error between the first relative frequency distribution and the second relative frequency distribution is calculated. A trial from determination of a setting of time windows to calculation of the error is repeatedly executed while changing the setting of the time windows. One or more settings of the time windows in which the error is less than a threshold value are selected and output.

5 Claims, 6 Drawing Sheets

INFORMATION PROCESSING METHOD

CROSS-REFERENCE TO RELATED APPLICATIONS

This application is based upon and claims the benefit of priority from prior Japanese Patent Application No. 2023-165679, filed on Sep. 27, 2023, the entire contents of which are incorporated herein by reference.

BACKGROUND

1. Field

The present disclosure relates to an information processing method.

2. Description of Related Art

Japanese Laid-Open Patent Publication No. 2008-108247 discloses an information processing device that compresses original data for analysis to reduce the data size. The original data for analysis is collected over a predetermined period using sensors installed on a vehicle.

The information processing device disclosed in the above document compresses data by extracting, from the original data, data segments obtained at the point in time when the vehicle reaches a certain vehicle speed and data segments at the inflection point of the vehicle speed.

This information processing device focuses only on extracting data segments based on vehicle speed. Thus, the information processing device cannot extract data segments according to features of data other than vehicle speed. There is a need for an information processing method that can obtain extracted data that captures the overall features of the original data.

SUMMARY

This Summary is provided to introduce a selection of concepts in a simplified form that are further described below in the Detailed Description. This Summary is not intended to identify key attributes or essential attributes of the claimed subject matter, nor is it intended to be used as an aid in determining the scope of the claimed subject matter.

An aspect of the present disclosure provides an information processing method executed by information processing circuitry. The information processing method includes collecting original data over a predetermined sensing period using sensors installed on a vehicle. The information processing method includes obtaining extracted data by extracting some data segments from the original data to reduce an amount of data used for analysis.

The obtaining the extracted data includes calculating a first relative frequency distribution in the original data for each of feature amounts. The feature amounts are included in the original data. The first relative frequency distribution is a relative frequency distribution for each of the feature amounts in the original data.

The obtaining the extracted data includes determining a setting of time windows. The setting of the time windows is determined to cut out the data segments corresponding to part of the predetermined sensing period from the original data. The setting of the time windows is determined such that a total period of the time windows is shorter than the predetermined sensing period.

The obtaining the extracted data includes cutting out the data segments from the original data using the time windows.

The obtaining the extracted data includes obtaining the extracted data by combining all of the data segments that have been cut out using the time windows and calculating a second relative frequency distribution for each of the feature amounts. The second relative frequency distribution is a relative frequency distribution in the extracted data.

The obtaining the extracted data includes calculating an error between the first relative frequency distribution and the second relative frequency distribution.

The obtaining the extracted data includes repeatedly executing, after obtaining the first relative frequency distribution, a trial from the determining the setting of the time windows to the calculating the error while changing the setting of the time windows and includes selecting and outputting one or more of the settings of the time windows in which the error is less than a threshold value.

One example of the information processing method includes obtaining section data segments corresponding to sections by dividing the original data into certain sections and executing clustering on the section data segments. The clustering is machine learning that classifies the section data segments into a predetermined number of clusters. In this example, the setting of the time windows is determined such that a ratio of each of the clusters in the extracted data is equal to a ratio of a corresponding one of the clusters in the entirety of the original data.

In the above-described information processing method, it is possible to find out, using the information processing circuitry, the setting in which the extracted data capturing the feature of the entirety of the original data can be obtained.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

In this specification, "at least one of A and B" should be understood to mean "only A, only B, or both A and B."

An information processing method and an information processing device that executes the information processing method according to an embodiment will now be described with reference to FIGS. 1 to 6.

Configuration of Information Processing System

Figure 1:
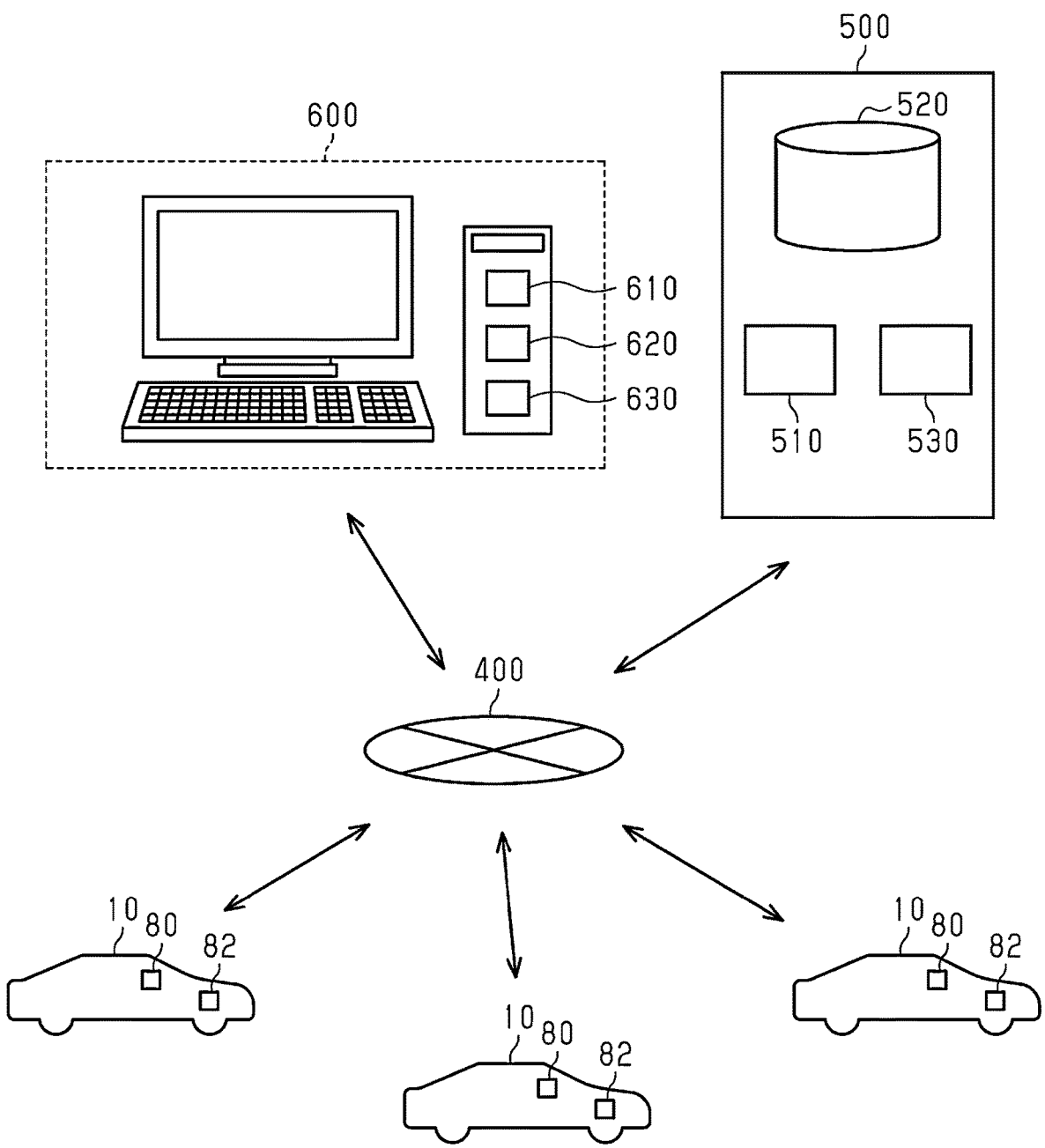
FIG. 1 is a schematic diagram showing the relationship between a data center that executes an information processing method, vehicles, and an information processing terminal.

FIG. 1 illustrates the configuration of an information processing system including a data center 500 including the information processing device according to an embodiment. As shown in FIG. 1, the data center 500 communicates with vehicles 10 via a communication network 400. The data center 500 also communicates with an information processing terminal 600 via the communication network 400.

Configuration of Data Center 500

As shown in FIG. 1, the data center 500 includes a center processing device 510 as the information processing device. The data center 500 includes a center storage device 520 and a center communication device 530. The center processing device 510 includes a CPU that executes processing in accordance with a program, and a ROM in which the program is stored. The center processing device 510 may include information processing circuitry. The center storage device 520 stores a large amount of data. The center communication device 530 is implemented as hardware (e.g., network adapter), various types of software for communication, or a combination thereof. The center communication device 530 performs wired or wireless communication via the communication network 400.

The data center 500 may be include computers. For example, the data center 500 may include server devices.

Configuration of Vehicle 10

Each of the vehicles 10 includes a vehicle communication device 80. These vehicle communication devices 80 are implemented as hardware (e.g., network adapter), various types of software for communication, or a combination thereof. The vehicle communication devices 80 are configured to execute wired or wireless communication via the communication network 400. Various sensors 82 that collect information of each part of the vehicle 10 are mounted on each vehicle 10.

In each vehicle 10, travel data is collected from the various sensors 82. Travel data is sent from each vehicle 10 to the data center 500 by the vehicle communication device 80. For example, travel data including a travel distance, position information, and a vehicle speed of each vehicle 10 is sent from each vehicle 10 to the data center 500. Identification information used to identify each vehicle 10 is also sent to the data center 500 together with the travel data.

The data center 500 stores the received identification information and the travel data in the center storage device 520. In this manner, the travel data of the vehicles 10 is accumulated in the center storage device 520.

Configuration of Information Processing Terminal 600

The information processing terminal 600 includes a terminal processing device 610, a terminal storage device 620, and a terminal communication device 630. The terminal processing device 610 includes a CPU that executes processing in accordance with a program, and a ROM in which the program is stored. The terminal storage device 620 stores a large amount of data. The terminal communication device 630 is implemented as hardware (e.g., network adapter), various types of software for communication, or a combination thereof. The terminal communication device 630 performs wired or wireless communication via the communication network 400.

The information processing terminal 600 is, for example, a personal computer.

Analysis of Travel Data of Vehicle 10

The information processing terminal 600 is used to analyze the travel data. To analyze the travel data, the terminal storage device 620 downloads part of the travel data from the enormous amount of travel data stored in the center storage device 520. The travel data to be downloaded is selected in accordance with the purpose of analysis. The terminal processing device 610 performs analysis using the downloaded travel data.

For example, the terminal processing device 610 calculates the load on a specific component of the vehicle 10 based on the travel data. The terminal processing device 610 estimates the damage accumulated in the component based on the calculated load. For example, the terminal processing device 610 performs analysis for estimating durability required for a specific component of the vehicle 10 based on the travel data of the vehicles 10.

To perform such analysis, for example, the terminal processing device 610 may analyze a large amount of travel data collected over a long period of time. When the terminal processing device 610 needs to perform an enormous amount of calculation, it takes a long time for analysis.

From a large amount of travel data that is original data, extracted data that captures features of the entire original data may be extracted. If such extracted data can be extracted, the terminal processing device 610 can perform analysis in a shorter time using the extracted data. For example, in a case where the damage of the components of the vehicle 10 that has traveled for 100,000 hours is estimated, the terminal processing device 610 estimates the damage using the extracted data for 20,000 hours that has been extracted from the original data for 100,000 hours. The terminal processing device 610 calculates the estimated value of the damage to the components of the vehicle 10 that has traveled for 100,000 hours by multiplying the estimated value calculated from the extracted data for 20,000 hours by 5.

Figure 2:
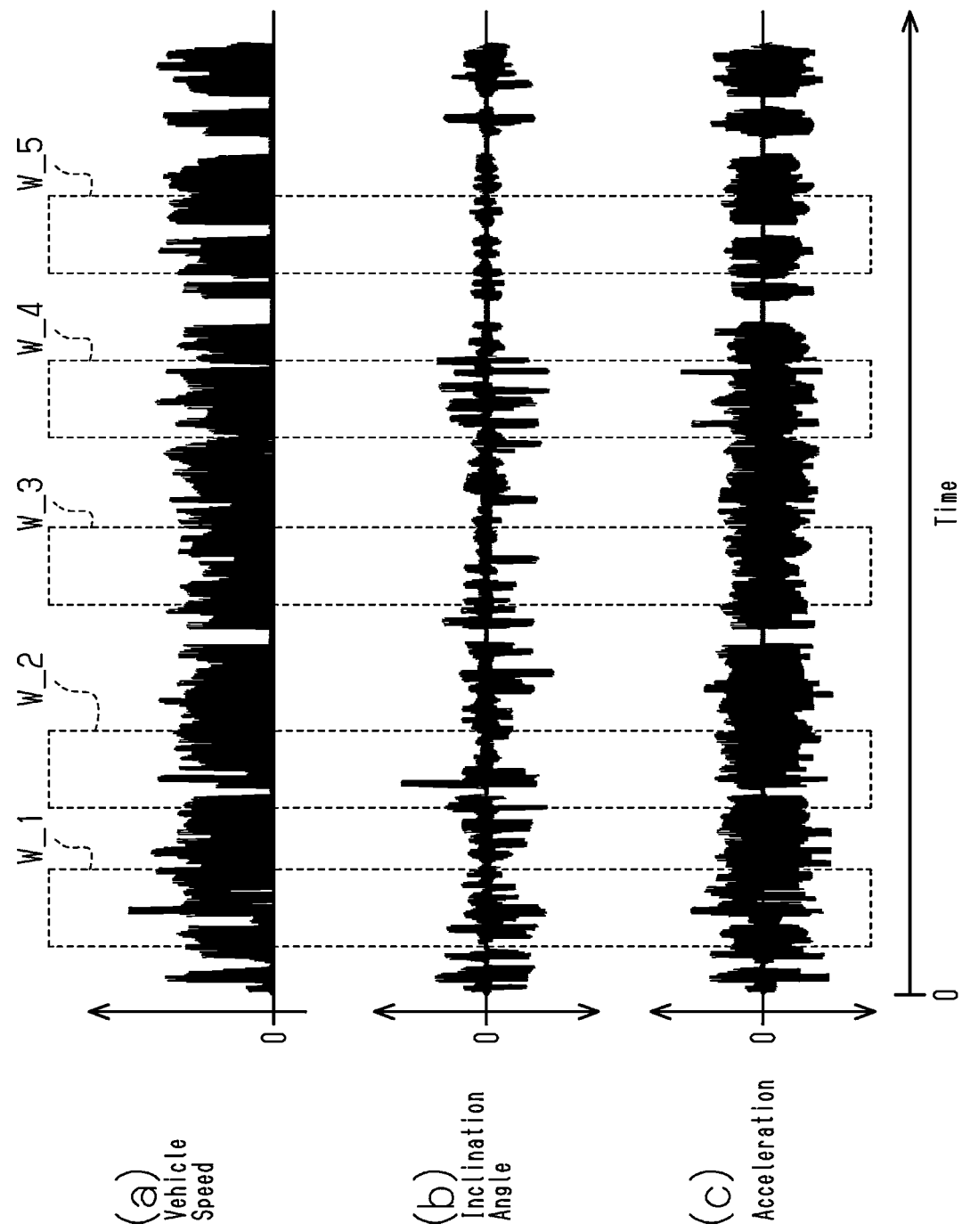
FIG. 2 illustrates graphs showing original data, where section (a) of FIG. 2 is a graph showing changes in the original data of the vehicle speed, section (b) of FIG. 2 is a graph showing changes in the original data of the inclination angle of the vehicle, and section (c) of FIG. 2 is a graph showing changes in the original data of the acceleration of the vehicle.

FIG. 2 shows an example of the original data. The original data shown in FIG. 2 is travel data for 100,000 hours in one vehicle 10. The original data illustrated in FIG. 2 includes a vehicle speed, an inclination angle, and an acceleration of the vehicle 10 as feature amounts.

Section (a) of FIG. 2 shows changes in the vehicle speed for 100,000 hours. Section (b) of FIG. 2 shows changes in the inclination angle of the vehicle 10 for 100,000 hours. The inclination angle has a positive value when the vehicle 10 passes through an uphill slope. The inclination angle has a negative value on a downward slope. Section (c) of FIG. 2 shows the acceleration of the vehicle 10. The acceleration is a positive value when the vehicle 10 is accelerating. The acceleration is a negative value when the vehicle 10 is decelerating.

The vehicle speed, the inclination angle, and the acceleration have a correlation with the load of the powertrain of the vehicle 10. The terminal processing device 610 estimates the load of the components of the powertrain from the travel data including the vehicle speed, the inclination angle, and the acceleration as the feature amounts.

When sending the data for analysis to the information processing terminal 600, the data center 500 sends the original data and also sends information used to extract the extracted data from the original data.

The extracted data is created by cutting out data segments from the original data using time windows. In FIG. 2, as an example of the time windows, five time windows including a first time window W_1, a second time window W_2, a third time window W_3, a fourth time window W_4, and a fifth time window W_5 are indicated by broken lines. The start and end of each time window are set such that the time windows do not overlap with each other. In this example, the travel data for 20,000 hours is cut out as the extracted data. Thus, the start and end of each time window are set such that the total period of the time windows W_1 to W_5 is 20,000 hours.

The data center 500 searches for the setting of the start time and the end time of each time window indicating a cutout pattern. The cutout pattern is used to extract extracted data that captures the feature of the entire original data. That is, the cutout pattern corresponds to the setting of time windows. The data center 500 sends, to the information processing terminal 600, the information on the cutout pattern for extracting the above-described extracted data together with the original data. That is, the information on the cutout pattern for extracting the extracted data is the information on the setting of each time window found by the search.

The information processing terminal 600 that has received the original data and the cutout pattern information determines the setting of the cutout pattern based on the received information. The information processing terminal 600 extracts the extracted data from the original data using the set cutout pattern. The information processing terminal 600 performs analysis using the extracted data.

Cutout Pattern Search Process

Figure 3:
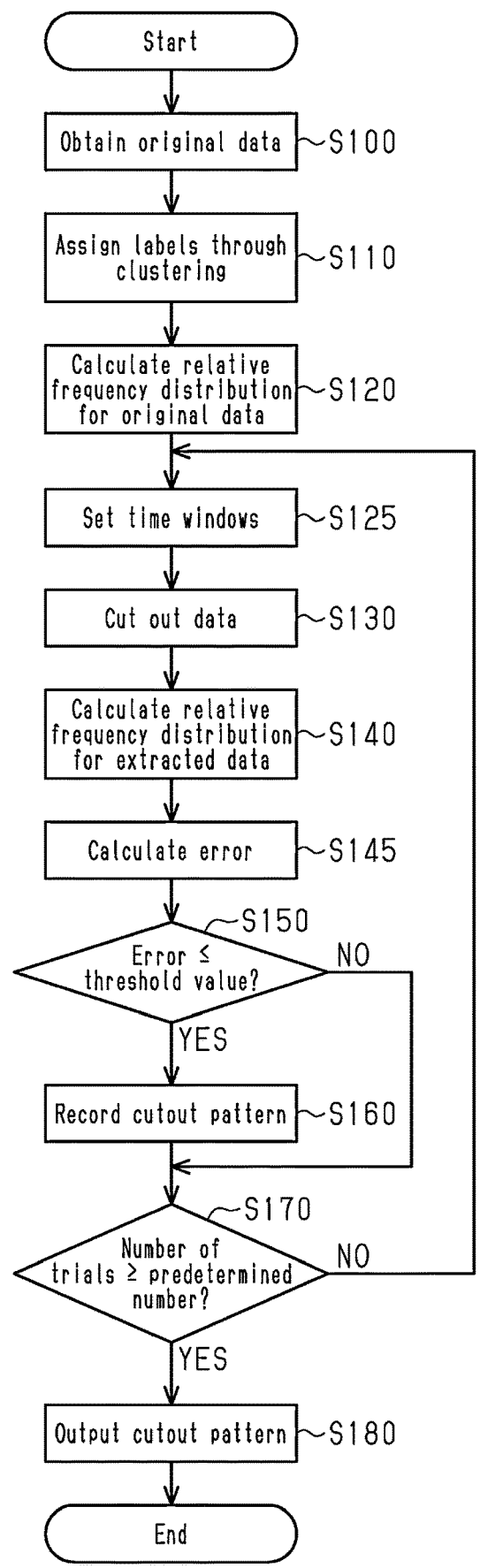
FIG. 3 is a flowchart illustrating the flow of processes executed by the center processing device of the data center.

FIG. 3 is a flowchart illustrating the flow of a series of processes related to a cutout pattern search process. The series of processes is executed by the center processing device 510.

As shown in FIG. 3, the center processing device 510 acquires original data in the process of step S100. The original data is part of the travel data selected in accordance with the purpose of analysis from the enormous amount of travel data stored in the center storage device 520. For example, a target vehicle 10 is selected from the vehicles 10. Original data for calculating the load applied to a specific component of one vehicle 10 is travel data of the target vehicle 10 over a predetermined sensing period.

In the process of step S110, the center processing device 510 assigns labels to the original data through clustering. Specifically, the center processing device 510 divides the original data into certain sections. Thus, section data segments corresponding to sections are obtained. The length of each section into which the original data is divided is, for example, several minutes. The center processing device 510 performs clustering, which is machine learning for classifying section data segments into a predetermined number of clusters. Examples of a clustering algorithm include a k-means method. The k-means method is a clustering algorithm for classifying data into a pre-specified number of clusters. However, the algorithm of clustering is not limited to the k-means method.

The original data includes travel data segments collected under different environments, such as a travel data segment when the vehicle 10 is traveling in an urban area, a travel data segment when the vehicle 10 is traveling in a suburban area, and a travel data segment when the vehicle 10 is traveling on an expressway. By performing clustering, travel data segments included in the original data can be classified into clusters of travel data segments having similar features. The number of clusters used for classification is arbitrarily set in accordance with the contents of analysis.

Figure 4:
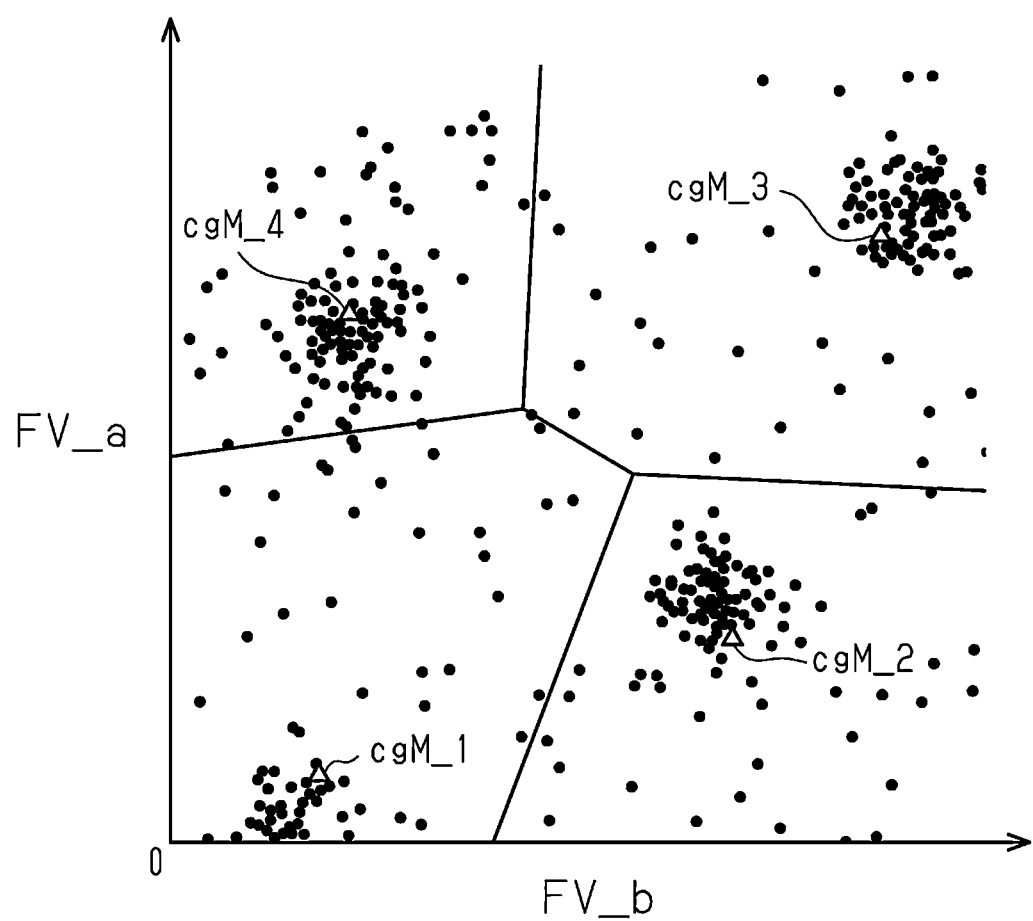
FIG. 4 is a graph showing an example in which the original data is clustered using two feature amounts.

FIG. 4 is a graph illustrating an example in which the original data is clustered into four clusters by the k-means method using two feature amounts included in the original data as explanatory variables. In FIG. 4, the data segments of each section obtained by dividing the original data are each indicated by one dot. To perform clustering, the center processing device 510 uses a representative value of the explanatory variable in the data segments of each section. For example, the center processing device 510 sets the average value of the feature amounts in the data segments of each section as the representative value. Alternatively, the center processing device 510 may use a moving average value of the feature amounts in sections continuous in time series as the representative value.

FIG. 4 illustrates points, each of which corresponds to the data segments in a section, in a two dimensional space in which a first feature amount FV_a and a second feature amount FV_b are set as coordinate axes. FIG. 4 is an example in which the original data is clustered into four clusters, including a first cluster M_1, a second cluster M_2, a third cluster M_3, and a fourth cluster M_4. In FIG. 4, the boundary between clusters is indicated by a solid line. In FIG. 4, the center of gravity of each cluster is indicated by a triangle. A centroid cgM_1 is the centroid of the first cluster M_1. A centroid cgM_2 is the centroid of the second cluster M_2. A centroid cgM_3 is the centroid of the third cluster M_3. A centroid cgM_4 is the centroid of the fourth cluster M_4.

FIG. 4 illustrates an example in which there are two explanatory variables, but the number of explanatory variables is not limited to two. For example, as in the example illustrated in FIG. 2, in a case where the original data includes three feature amounts such as the vehicle speed, the inclination angle, and the acceleration, the center processing device 510 may perform clustering using these three feature amounts as explanatory variables. In this case, the center processing device 510 clusters the original data in the three dimensional coordinate space.

The center processing device 510 assigns labels indicating the clustering result to the original data. Specifically, labels for identifying a cluster into which data is classified is assigned to each data segment indicated by points in the coordinate space. In this manner, the center processing device 510 creates original data to which labels are added.

Next, in the process of step S120, the center processing device 510 calculates a first relative frequency distribution as a relative frequency distribution for the original data. As described above, the original data includes feature amounts. The center processing device 510 calculates the first relative frequency distribution in the original data for each feature amount.

The frequency distribution classifies data segments into classes and represents a distribution for frequencies as the number of data segments included in each class. The relative frequency indicates the percentage of the frequency of the class with respect to the total sum of the frequencies.

Figure 5:
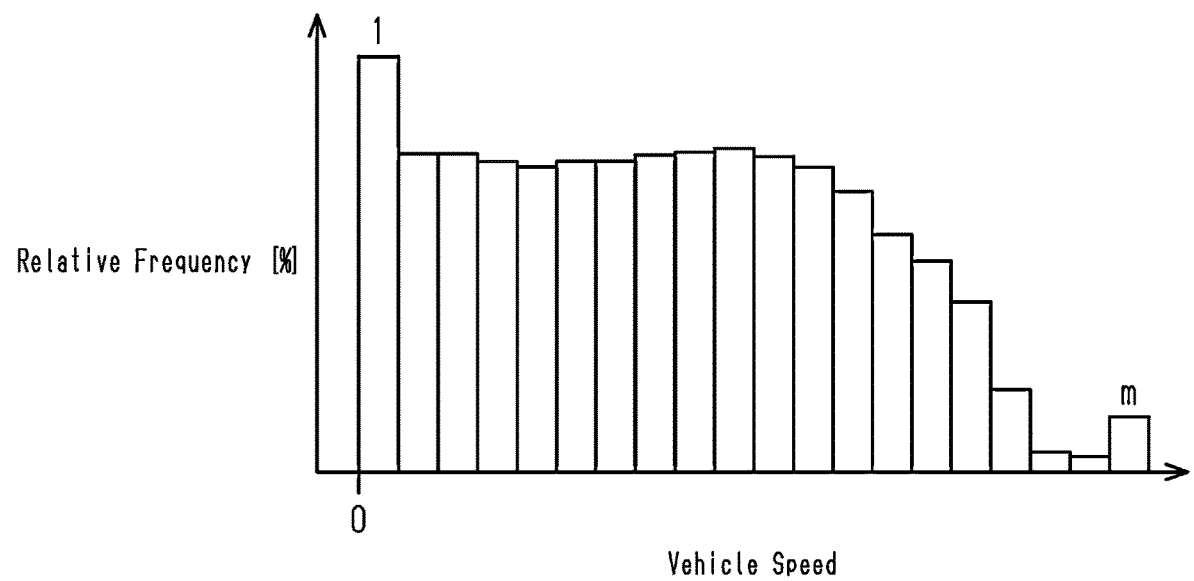
FIG. 5 is a graph showing an example of the relative frequency distribution for the vehicle speed in the original data.

FIG. 5 shows the first relative frequency distribution for the vehicle speed in the original data shown in section (a) of FIG. 2. In the first relative frequency distribution, all the data segments of the vehicle speed in the original data are divided into m classes from 1 to m.

Figure 6:
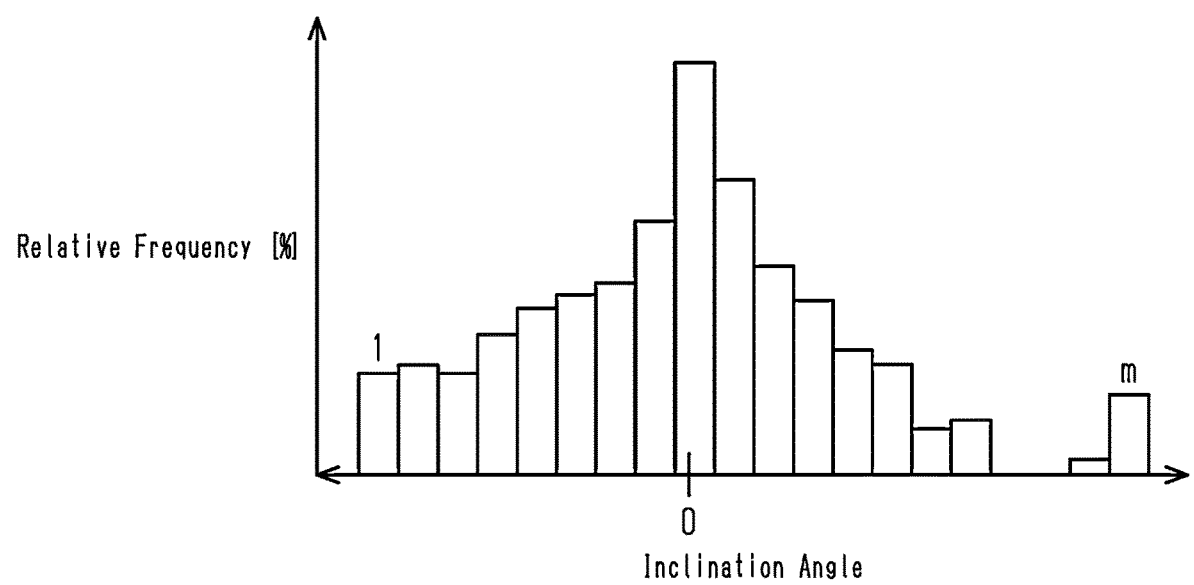
FIG. 6 is a graph showing an example of the relative frequency distribution for the inclination angle in the original data.

FIG. 6 shows the first relative frequency distribution with respect to the inclination angle in the original data shown in section (b) of FIG. 2. In the first relative frequency distribution, all the data segments of the inclination angle in the original data are divided into m classes from 1 to m.

In the process of step S120, the center processing device 510 calculates the first relative frequency distribution for each feature amount included in the original data. The number of classes in the first relative frequency distribution for each feature amount is the same between the feature amounts.

For example, as in the example illustrated in FIG. 2, when the original data includes three feature amounts (i.e., the vehicle speed, the inclination angle, and the acceleration), the center processing device 510 calculates the first relative frequency distribution for each of the three feature amounts.

Next, the center processing device 510 determines the setting of time windows to extract the extracted data from the original data in the process of step S125.

In FIG. 2, as an example of the time windows, five time windows W_1 to W_5, namely, a first time window W_1, a second time window W_2, a third time window W_3, a fourth time window W_4, and a fifth time window W_5 are illustrated. In the example shown in FIG. 2, the periods of the time windows are all equal to each other. In the example shown in FIG. 2, the data cut out by each time window (i.e., each cutout window) is data of each feature amount in the periods of the same length.

In the process of step S125, the center processing device 510 randomly sets time windows such that the total period of all the time windows is shorter than the predetermined sensing period, which is the period of the entire original data. As will be described later, the center processing device 510 creates extracted data by combining all data segments that have been cut out using set time windows. The total period of all the time windows is a value that determines the volume of the extracted data. Therefore, the total period of all the time windows is predetermined.

For example, the center processing device 510 randomly sets the number of time windows, the start time of each time window, and the end time of each time window each time the process of step S125 is executed. In this situation, the center processing device 510 determines the setting of each time window such that the time windows do not overlap each other. The center processing device 510 randomly sets time windows so that the total period of all the time windows becomes a preset period. As shown in FIG. 2, the center processing device 510 may determine the setting of the time windows such that the periods of the time windows are fixed to constant values (periods of the same lengths) in the process of step S125. The center processing device 510 may determine the setting of the time windows such that the number of the time windows is fixed to a certain value in the process of step S125.

In addition to the requirements described above, the center processing device 510 determines the setting of the time windows through step S125 such that the ratio of each cluster in the extracted data is equal to the ratio of a corresponding cluster in the entirety of the original data.

The cutout pattern is determined by determining the setting of the time windows through the process in step S125. The cutout pattern is used to cut out data segments from the original data. Upon determining the cutout pattern, the center processing device 510 advances the process to step S130.

In the process of step S130, the center processing device 510 cuts out data segments from the original in the determined cutout pattern. That is, in the process of step S130, the center processing device 510 cuts out data segments from the original data using the set time windows. The center processing device 510 creates extracted data by combining all data segments that have been cut out using the time windows.

In the process of the next step S140, the center processing device 510 calculates a second relative frequency distribution as the relative frequency distribution for the extracted data. The center processing device 510 calculates the second relative frequency distribution for the extracted data using the same method as the method of calculating the first relative frequency distributions in step S120. That is, in the process of step S140, the center processing device 510 calculates the second relative frequency distributions in the extracted data for each feature amount. In this situation, the center processing device 510 sets the number of classes in the second relative frequency distributions of the feature amounts to be equal to the number of classes in the first relative frequency distributions in step S120.

For example, as in the example illustrated in FIG. 2, when the original data includes three feature amounts (i.e., the vehicle speed, the inclination angle, and the acceleration), the center processing device 510 calculates, as feature amounts the second relative frequency distribution for each of the three feature amounts, as in step S140.

Next, in the process of step S145, the center processing device 510 calculates the difference between the first relative frequency distribution in the original data and the second relative frequency distribution in the extracted data. For example, the center processing device 510 calculates a mean absolute error (MAE). The mean absolute error MAE is expressed by the following equation.

$$MAE = \frac{1}{n}\sum_{i=1}^{n}\sum_{j=1}^{m}|Y_{nm} - y_{nm}|$$ Equation 1

In the above formula, n is the number of feature amounts, m is the number of classes in the second relative frequency distribution, Y is the frequency of the corresponding feature amount in the corresponding class in the original data, and y is the frequency of the corresponding feature amount in the corresponding class in the extracted data.

As shown in the above formula, the center processing device 510 calculates, as an error, the sum of the errors of the frequency in each class for each feature amount of the first relative frequency distribution in the entire original data and the second relative frequency distribution in the extracted data.

After calculating the error, the center processing device 510 advances the process to step S150. In the process of step S150, the center processing device 510 determines whether the calculated error is less than or equal to a threshold value. The threshold value is used to determine whether the extracted data having the second relative frequency distribution close to the first relative frequency distribution in the original data has been extracted using the set cutout pattern.

The magnitude of the threshold value is set in advance so as to determine that the extracted data having the second relative frequency distribution close to the first relative frequency distribution in the original data has been extracted based on the error being less than or equal to the threshold value.

In the process of step S150, when it is determined that the error is less than or equal to a threshold value (step S150: YES), the center processing device 510 advances the process to step S160. In the process of step S160, the center processing device 510 records the cutout pattern. Specifically, the center processing device 510 stores the data of the start time and the end time of each time window in the cutout pattern in the center storage device 520, as the information used to identify the cutout pattern. When the cutout pattern is recorded in this manner, the center processing device 510 advances the process to step S170.

In the process of step S150, when it is determined that the error is larger than the threshold value (step S150: NO), the center processing device 510 does not execute the process of step S160, and advances the process to step S170. That is, the center processing device 510 advances the process to step S170 without recording the cutout pattern.

In the process of step S170, the center processing device 510 determines whether the number of trials is greater than or equal to a predetermined number. The number of trials is the number of times trials including the processes of step S125 to step S145 are executed. This trial is a trial of searching for a cutout pattern used to extract the extracted data. The predetermined number of times is a threshold value used to determine that the trial of searching for the cutout pattern for extracting the extracted data has been executed a sufficient number of times. The predetermined number of times is set in advance so as to determine that the cutout pattern has been sufficiently searched for based on the number of trials being greater than or equal to the predetermined number of times.

In the process of step S170, when it is determined that the number of trials is less than the predetermined number of times (step S170: NO), the center processing device 510 returns the process to step S125 to perform a trial again. That is, the center processing device 510 newly determines the setting of time windows, thereby executing the trial of cutting out the extracted data again.

In the process of step S170, when it is determined that the number of trials is greater than or equal to the predetermined number of times (step S170: YES), the center processing device 510 advances the process to step S180.

In this manner, the center processing device 510 repeats the trial until the number of trials reaches the predetermined number. The cutout pattern in which the error is less than or equal to the threshold value is stored in the center storage device 520. When the number of trials reaches the predetermined number, the center processing device 510 advances the process to step S180.

In the process of step S180, the center processing device 510 outputs the cutout pattern stored in the center storage device 520. Specifically, the center processing device 510 sends one or more settings of time windows in which the error is less than or equal to the threshold value, which are recorded in the center storage device 520, to the information processing terminal 600 as candidates of the cutout pattern. When the cutout pattern is output in the process of step S180, the center processing device 510 ends the series of processes.

Through the series of processes, the center processing device 510 selects and outputs all the settings of the time windows in which the error is less than or equal to the threshold value from the settings of the time windows for which the trial has been performed.

Operation of Present Embodiment

As described above, the center processing device 510 executes an information processing method for searching for the setting of the time windows for reducing the amount of data used for analysis.

The information processing method of this embodiment includes a first process (step S120). In the first process (step S120), the center processing device 510 calculates the first relative frequency distribution in the original data for each of feature amounts included in the original data. The information processing method includes a second process (step S125). In the second process (step S125), the center processing device 510 determines the setting of time windows such that the total period of all the time windows is shorter than the predetermined sensing period. The information processing method includes a third process (step S130). In the third process (step S130), the center processing device 510 cuts out data segments from the original data using time windows. The information processing method includes a fourth process (step S140). In the fourth process (step S140), the center processing device 510 obtains the extracted data by combining all the data segments that have been cut out by the time windows. Further, the second relative frequency distribution in the extracted data is calculated for each feature amount. The information processing method includes a fifth process (step S145). In the fifth process (step S145), the center processing device 510 calculates the error between the first relative frequency distribution in the original data and the second relative frequency distribution in the extracted data.

The information processing method includes the center processing device 510 repeatedly executing trials from the second process to the fifth process while changing the setting of the time windows after executing the first process. The center processing device 510 selects and outputs settings of time windows in which the error is less than the threshold value.

In this information processing method, the center processing device 510 calculates the error between the first relative frequency distribution for each feature amount in the entire original data and the second relative frequency distribution for each feature amount in the extracted data. The center processing device 510 repeats the calculation of the error while changing the setting of time windows for cutting out data segments from the original data. The center processing device 510 selects and outputs one or more settings in which the error is less than the threshold value.

In this information processing method, it is possible to cause the center processing device 510 to search for the setting of time windows. With the setting output from the center processing device 510 using the information processing method, the extracted data can be cut out such that the second relative frequency distribution for each feature amount of the extracted data is close to the first relative frequency distribution for a corresponding feature amount of the entirety of the original data.

Advantages of Present Embodiment (1) In the above-described information processing method, it is possible to find out the setting of time windows in which the extracted data capturing the feature of the entirety of the original data can be obtained.

(2) In the above example, the original data includes the vehicle speed, the inclination angle, and the acceleration as feature amounts. In this case, the center processing device 510 calculates the first relative frequency distribution for the vehicle speed in the original data in the first process. Similarly, in this case, the center processing device 510 calculates the first relative frequency distribution for the inclination angle in the original data in the first process. Similarly, in this case, the center processing device 510 calculates the first relative frequency distribution for the acceleration in the original data in the first process.

In this case, the center processing device 510 calculates the second relative frequency distribution for the vehicle speed in the extracted data in the fourth process. Similarly, in this case, the center processing device 510 calculates the second relative frequency distribution for the inclination angle in the extracted data in the fourth process. Similarly, in this case, the center processing device 510 calculates the second relative frequency distribution for the acceleration in the extracted data in the fourth process.

The vehicle speed, the inclination angle, and the acceleration have a correlation with the load of the powertrain of the vehicle 10. By obtaining the extracted data comprising vehicle speed, inclination angle and acceleration, the load on the powertrain of the vehicle 10 can be estimated with a smaller amount of data.

Therefore, the center processing device 510 can find out the setting of the time windows in which the extracted data used for the estimation of the load on the powertrain of the vehicle 10 can be obtained.

(3) The above-described information processing method includes the step (step S110) in which the center processing device 510 performs clustering. The clustering is machine learning for classifying, into a predetermined number of clusters, section data segments obtained by dividing the original data into certain sections. In the above-described information processing method, the center processing device 510 determines the setting of time windows in the second process (step S125). The setting of the time windows is determined such that the ratio of each cluster in the extracted data is equal to the ratio of a corresponding cluster in the entire original data.

Sections classified into the same cluster have similar features. In the setting output from the center processing device 510 by the above-described information processing method, the extracted data can be cut out such that the following two conditions are satisfied. The ratio of each cluster of the extracted data is equal to the ratio of a corresponding cluster of the entire original data. In addition, the second relative frequency distribution for each feature amount of the extracted data is close to the first relative frequency distribution for a corresponding feature amount of the entire original data.

Accordingly, in the above-described information processing method, it is possible to find out the setting of the time windows with which the extracted data having a feature closer to the feature of the entire original data can be obtained.

(4) In the above-described information processing method, the center processing device 510 selects and outputs all of one or more settings of the time windows in which the error is less than or equal to the threshold value, from the settings of the time windows in which trials are performed.

In the above-described information processing method, all cutout patterns having an error equal to or smaller than the threshold value are output. Thus, by comparing the output cutout patterns with each other, it is possible to finally select which cutout pattern is to be adopted from the cutout patterns.

Modifications

The present embodiments may be modified as follows. The present embodiment and the following modifications can be combined as long as the combined modifications remain technically consistent with each other.

The example in which the center processing device 510 determines the setting of time windows such that the ratio of a corresponding cluster in the original data is equal to the ratio of each cluster in the extracted data has been described. Without such a restriction, the center processing device 510 may determine the setting of time windows. In this case, the process of step S110 for clustering may be omitted.

In the above-described information processing method, in the fifth process, the center processing device 510 calculates a section error, which is the difference in relative frequency for each class between the first relative frequency distribution for the original data and the second relative frequency distribution for the extracted data. Then, the sum of section errors is simply calculated. The section errors may be adjusted by multiplying the calculated section errors by weights, and then the sum of the section errors may be calculated as the error.

Figure 7:
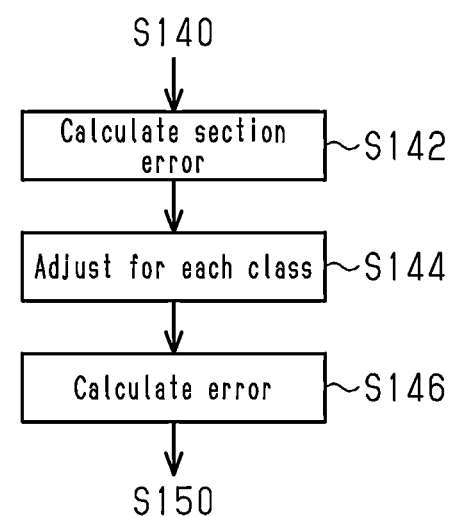
FIG. 7 is a flowchart illustrating part of the flow of processes executed by a processing device that executes an information processing method according to a modification.

In this case, as shown in FIG. 7, the center processing device 510 calculates the second relative frequency distribution for the extracted data in the process of step S140, and then advances the process to step S142. In the process of step S142, the center processing device 510 calculates the section error, which is the difference in relative frequency between the first relative frequency distribution for the original data and the second relative frequency distribution for the extracted data for each class.

Next, in the process of step S144, the center processing device 510 multiplies the calculated section error by a weight for each class, thereby adjusting the section error for each class. In the process of step S146, the center processing device 510 calculates the sum of the adjusted section errors as errors. The center processing device 510 executes the processing in step S150 and subsequent steps using the errors calculated in this manner.

Depending on the feature amount, the appearance frequency of each class may be largely biased. As described above, in the information processing method of performing adjustment by multiplying each section error by a weight, the following advantages can be obtained. By adjusting the weight of the section error, the error can be calculated so as to limit the influence of the deviation of the appearance frequency.

The method for determining the setting of time windows in the cutout pattern does not be performed randomly. The trial may be repeated by changing the setting of the time windows in the cutout pattern in accordance with a rule set in advance.

The error calculated in step S145 are not limited to the mean absolute error MAE. For example, the center processing device 510 may calculate a mean square error as the error. The center processing device 510 may calculate a root mean square error as the error.

In the information processing method of the above embodiment, all of the cutout patterns stored in the center storage device 520 are output in the process of step S180. The information processing method does not have to output all the cutout patterns. For example, the information processing method may be a method of selecting and outputting a cutout pattern having the smallest error among the cutout patterns stored in the center storage device 520.

In the above embodiment, the example in which the information processing device or the information processing circuitry is used as the center processing device 510 is described. Instead, the information processing device or the information processing circuitry may be used as the terminal processing device 610. In this case, the terminal processing device 610 downloads the original data from the data center 500, and executes the series of processes shown in FIGS. 3 and 7.

An information processing device including an execution device and a memory are not limited to a device that includes a CPU and a ROM and executes software processing. That is, the controller including the information processing device or information processing circuitry may be modified if it has any one of the following configurations (a) to (c):

(a) The controller includes one or more processors that execute various processes in accordance with a computer program. The processor includes a CPU and a memory, such as a RAM and ROM. The memory stores program codes or instructions configured to cause the CPU to execute the processes. The memory, or a non-transitory computer-readable storage medium, includes any type of media that are accessible by general-purpose computers and dedicated computers.

(b) The controller includes one or more dedicated hardware circuits that execute various processes. Examples of the dedicated hardware circuits include an application-specific integrated circuit (ASIC) and a field-programmable gate array (FPGA).

(c) The controller includes a processor that executes part of various processes in accordance with a computer program and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information processing method executed by information processing circuitry, the information processing method comprising:
    collecting original data over a predetermined sensing period using sensors installed on a vehicle; and
    obtaining extracted data by extracting data segments from the original data to reduce an amount of data used for analysis, wherein
    the obtaining the extracted data includes:
        calculating a first relative frequency distribution in the original data for each of feature amounts, the feature amounts being included in the original data, and the first relative frequency distribution being a relative frequency distribution for each of the feature amounts in the original data;
        determining a setting of time windows, the setting of the time windows being determined to cut out the data segments corresponding to part of the predetermined sensing period from the original data, and the setting of the time windows being determined such that a total period of the time windows is shorter than the predetermined sensing period;
        cutting out the data segments from the original data using the time windows;
        obtaining the extracted data by combining all of the data segments that have been cut out using the time windows;
        calculating a second relative frequency distribution for each of the feature amounts, the second relative frequency distribution being a relative frequency distribution in the extracted data;
        calculating an error between the first relative frequency distribution and the second relative frequency distribution;
        after obtaining the first relative frequency distribution, repeatedly executing a trial from the determining the setting of the time windows to the calculating the error while changing the setting of the time windows; and
        selecting and outputting one or more of the settings of the time windows in which the error is less than a threshold value.

2. The information processing method according to claim 1, wherein
    the feature amounts include a vehicle speed, an inclination angle, and an acceleration,
    the calculating the first relative frequency distribution includes calculating a relative frequency distribution for the vehicle speed in the original data, a relative frequency distribution for the inclination angle in the original data, and a relative frequency distribution for the acceleration in the original data, and
    the calculating the second relative frequency distribution includes calculating a relative frequency distribution for the vehicle speed in the extracted data, a relative frequency distribution for the inclination angle in the extracted data, and a relative frequency distribution for the acceleration in the extracted data.

3. The information processing method according to claim 1, wherein
    the determining the setting of the time windows includes:
        obtaining section data segments corresponding to sections by dividing the original data into certain sections;
        executing clustering on the section data segments, the clustering being machine learning that classifies the section data segments into a predetermined number of clusters; and
        determining the setting of the time windows such that a ratio of each of the clusters in the extracted data is equal to a ratio of a corresponding one of the clusters in the entirety of the original data.

4. The information processing method according to claim 1, wherein
    the selecting and outputting the setting of the time windows includes selecting and outputting all of the one or more of the settings of the time windows in which the error is less than or equal to the threshold value from the settings of the time windows for which the trial has been made.

5. The information processing method according to claim 1, wherein
the calculating the error between the first relative frequency distribution and the second relative frequency distribution includes:
calculating section errors in the first relative frequency distribution and the second relative frequency distribution, each of the section errors being a difference between a relative frequency for each of classes in the first relative frequency distribution and a relative frequency for a corresponding one of the classes in the second relative frequency distribution;
multiplying each of the calculated section errors by a weight, thereby adjusting each of the section errors; and
calculating a sum of the adjusted section errors as the error.

* * * * *